April 4, 1967 H. HOPE 3,312,462
MACHINE FOR FEEDING X-RAY FILM OR THE LIKE
Filed Jan. 25, 1965 6 Sheets-Sheet 1
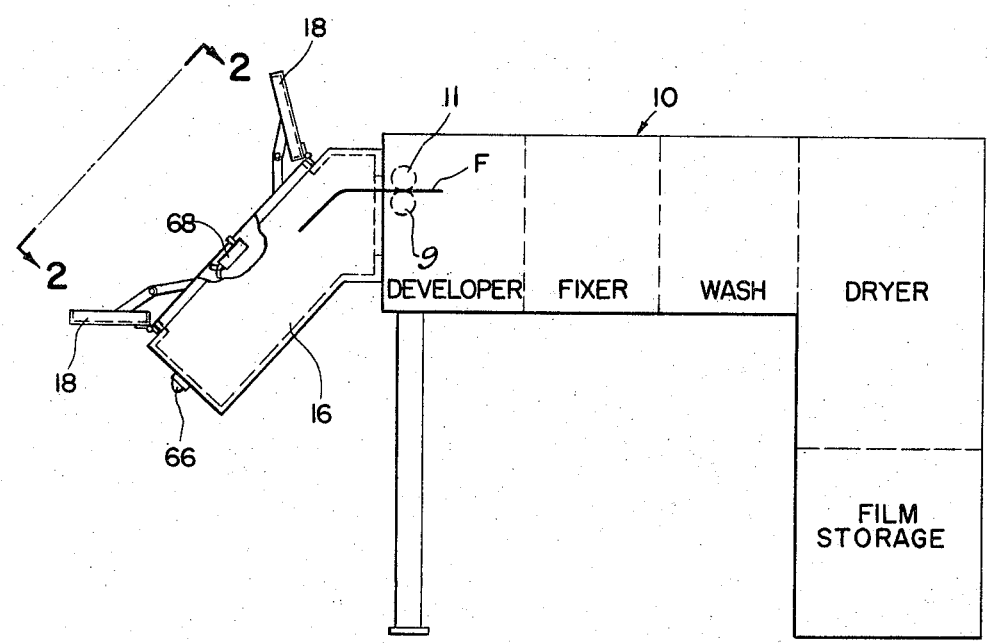
FIG.-1-
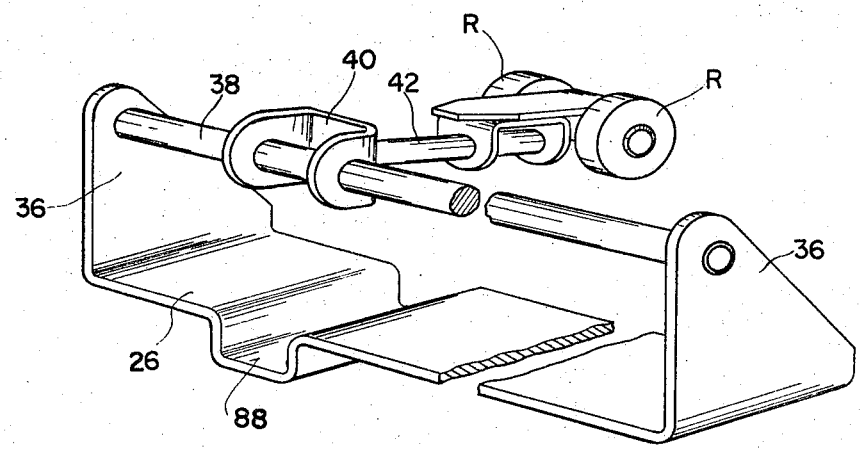
FIG.-12-
INVENTOR.
HENRY HOPE
BY
ATTORNEY

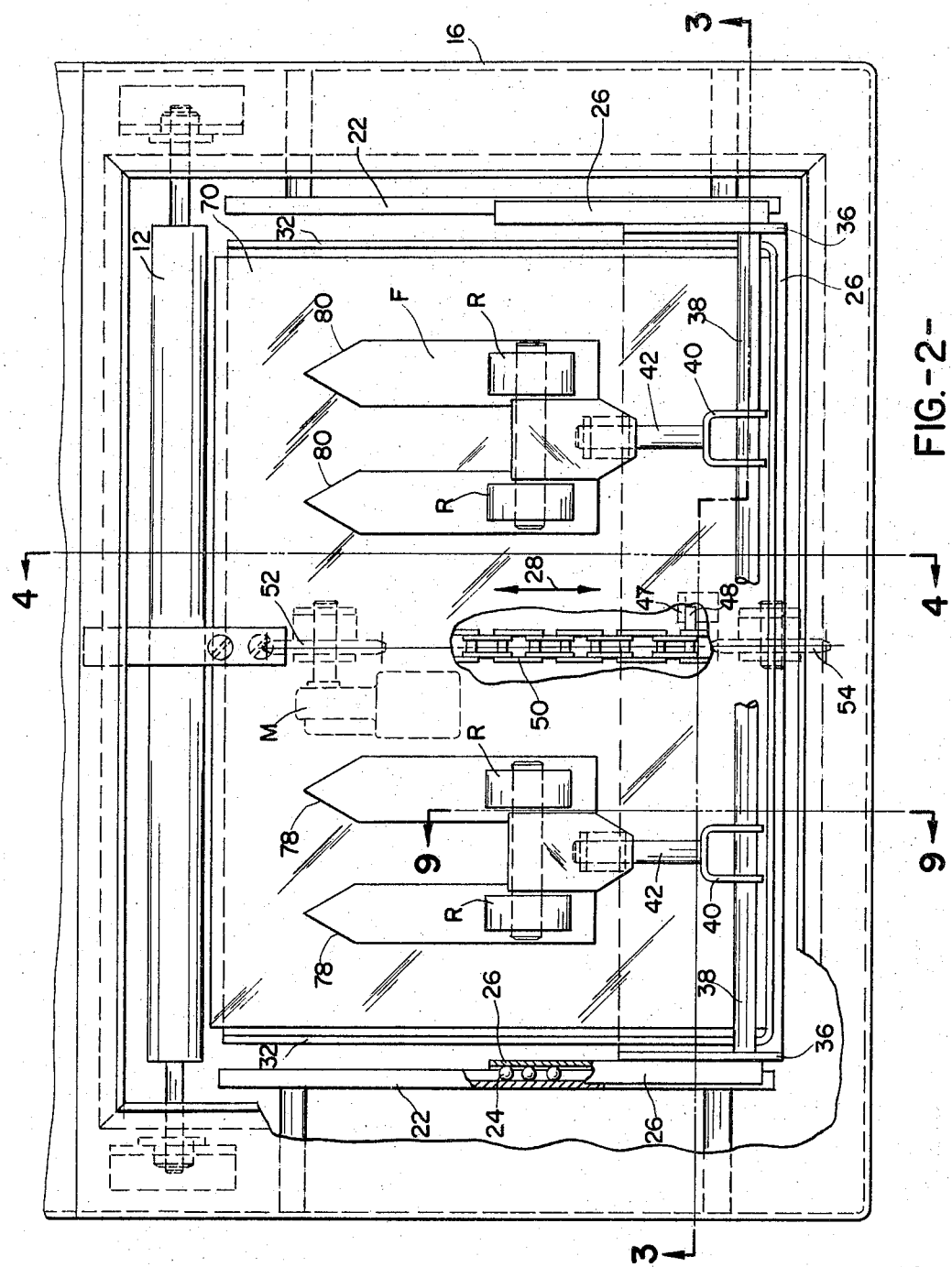

April 4, 1967 H. HOPE 3,312,462
MACHINE FOR FEEDING X-RAY FILM OR THE LIKE
Filed Jan. 25, 1965 6 Sheets-Sheet 3
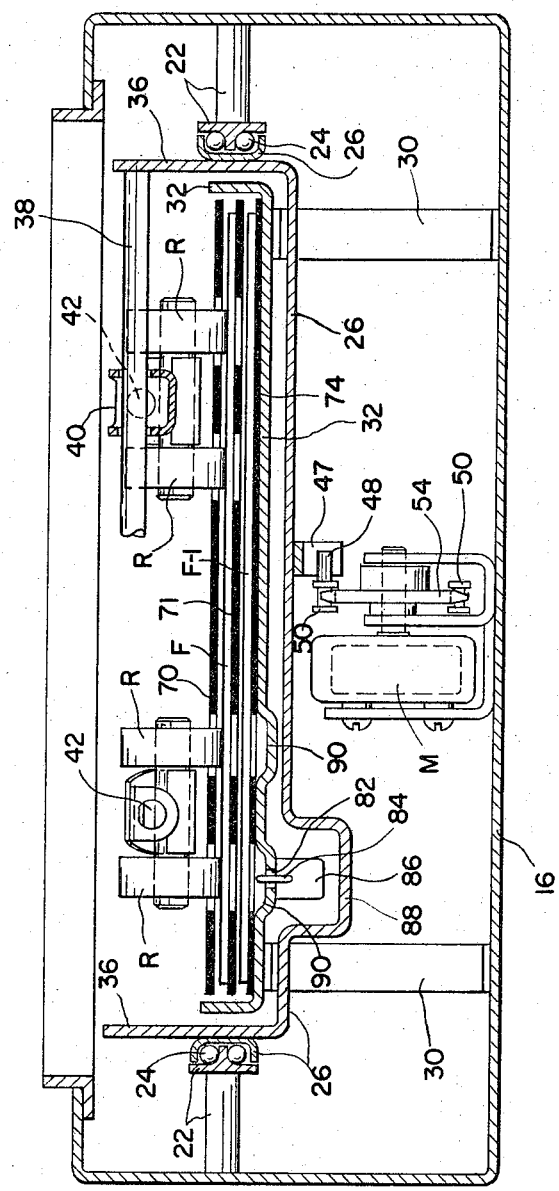
FIG.-3-
INVENTOR.
HENRY HOPE
BY
ATTORNEY

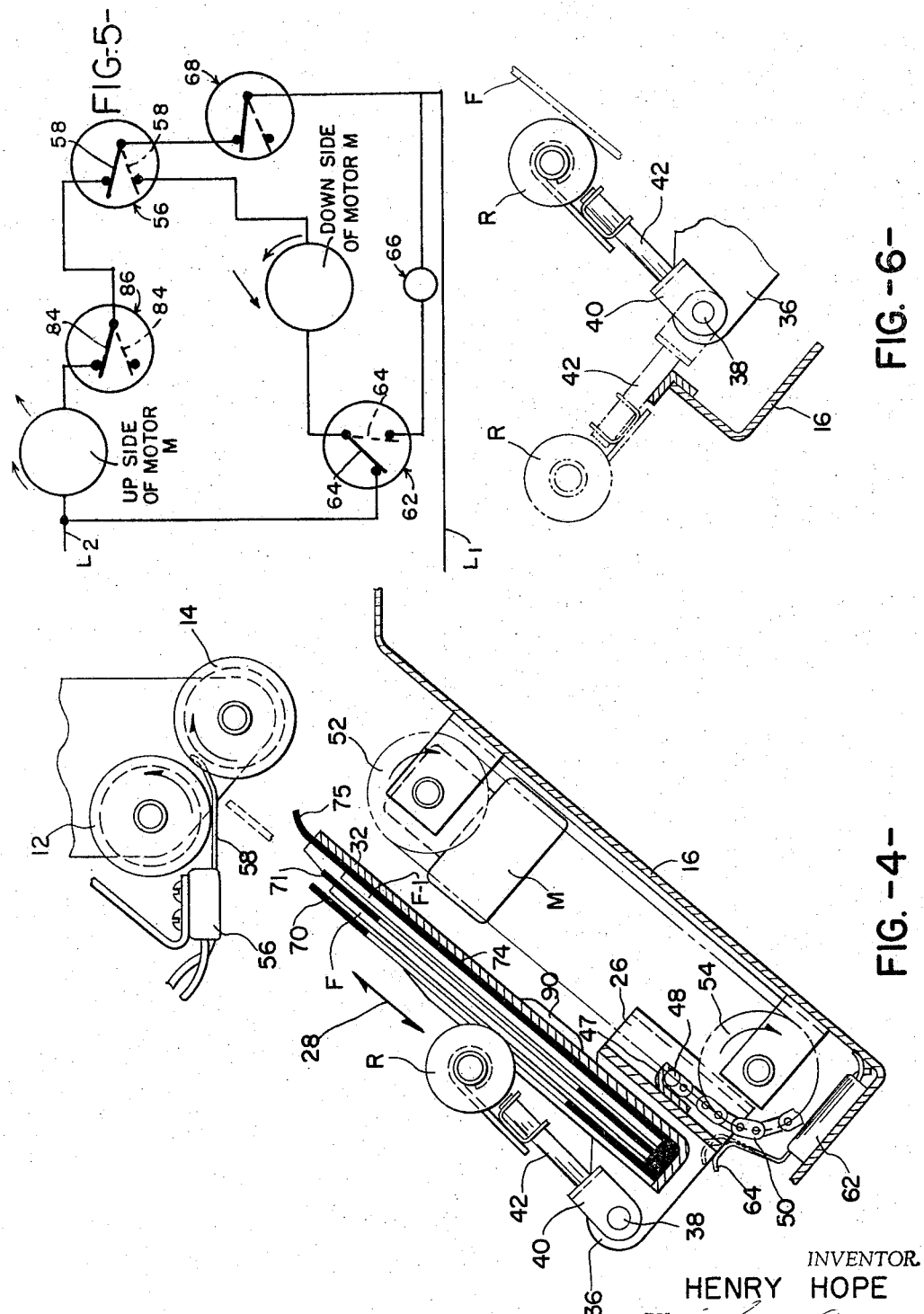

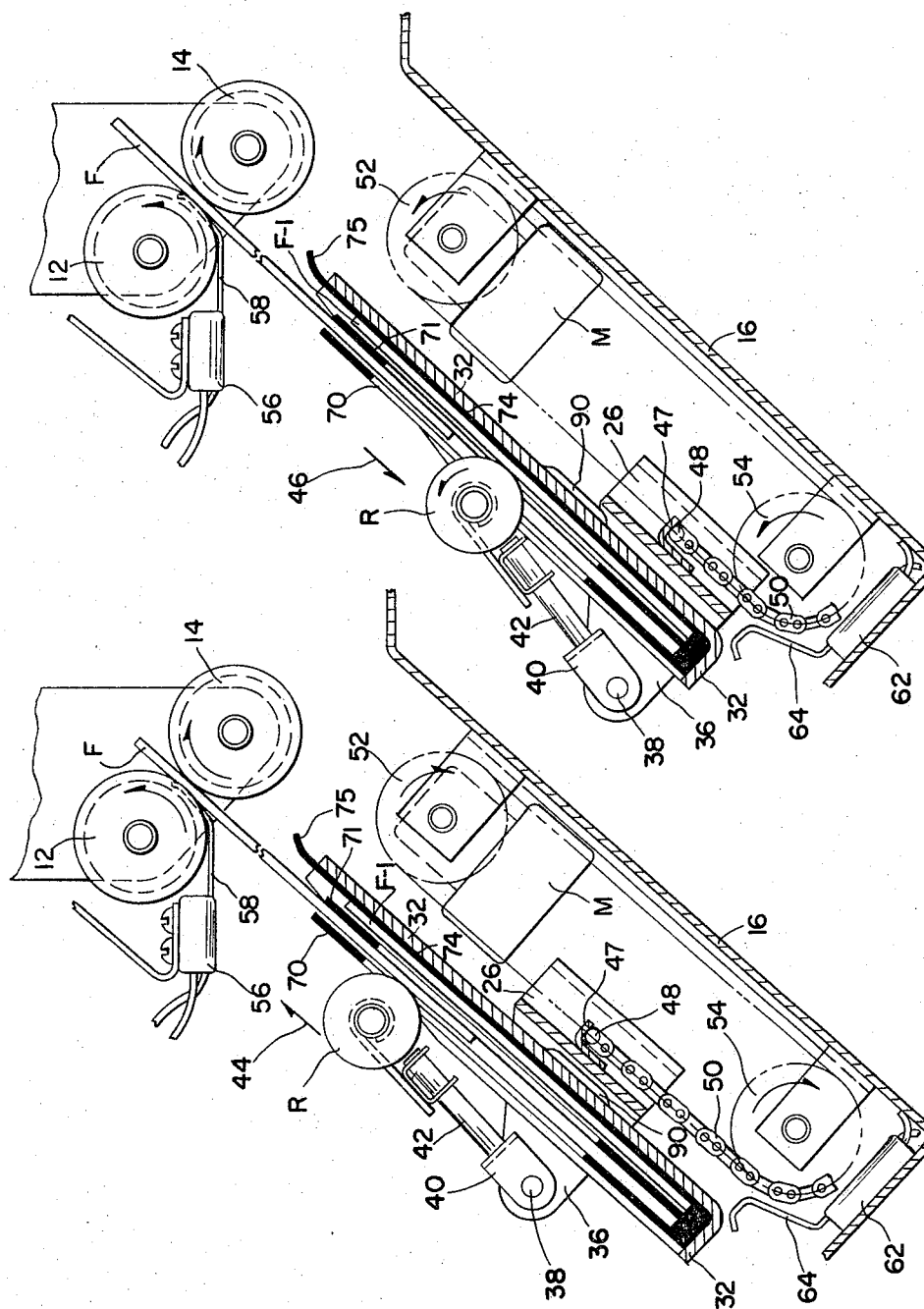

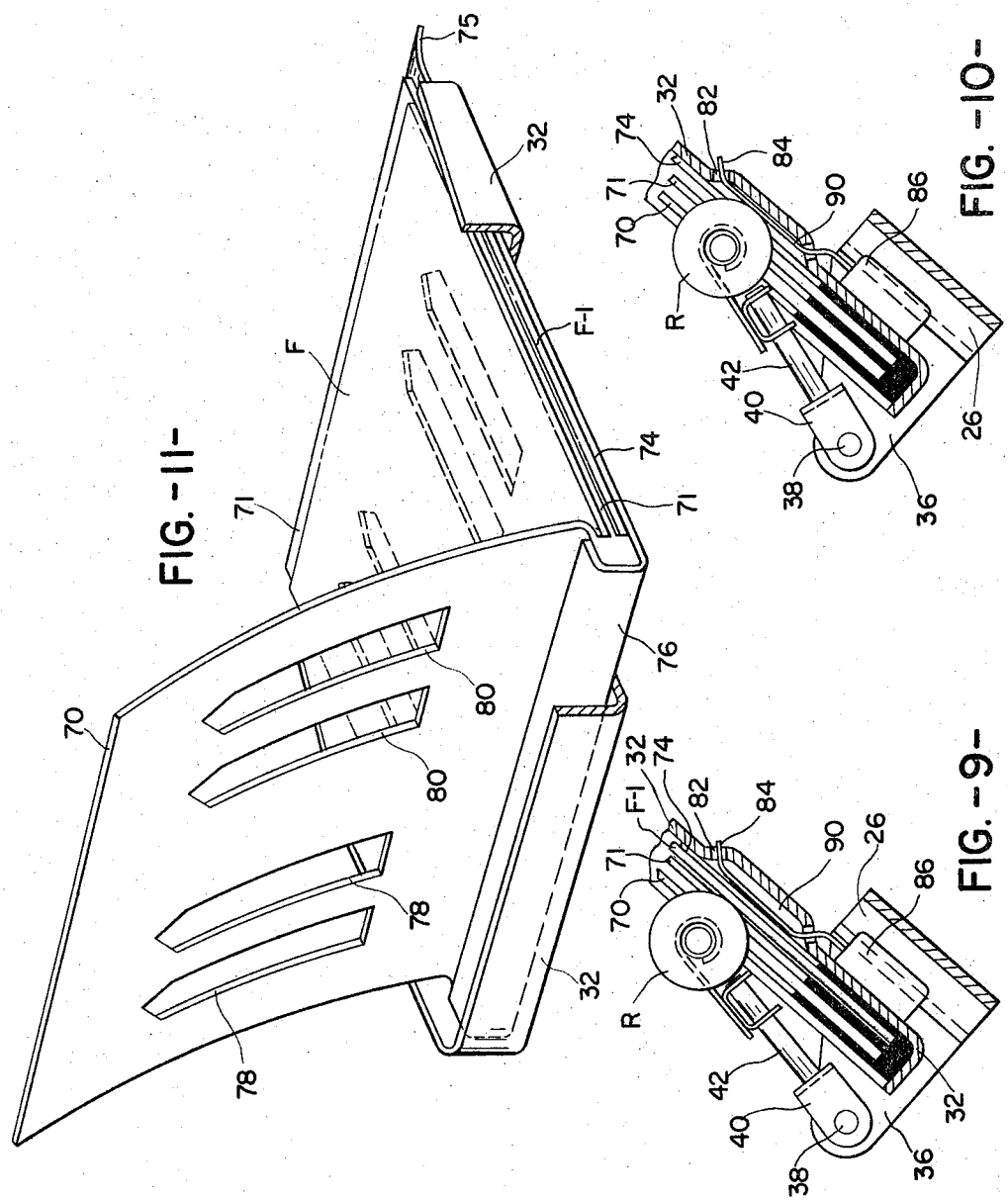

United States Patent Office 3,312,462
Patented Apr. 4, 1967

3,312,462
MACHINE FOR FEEDING X-RAY
FILM OR THE LIKE
Henry Hope, 195 Welsh Road, Huntingdon
Valley, Pa. 19006
Filed Jan. 25, 1965, Ser. No. 427,891
5 Claims. (Cl. 271—4)

My invention relates to a machine for automatically feeding exposed X-ray film to an automatic X-ray film processing machine.

One object of the invention is to produce an improved X-ray film feeding machine of the type set forth.

A further object is to produce an improved automatic X-ray film feeding machine which is simple, inexpensive, compact and reliable.

A still further object is to produce an automatic X-ray film feeding machine which may be incorporated as an integral part of newly manufactured X-ray film processing machines and which can, with negligible effort, skill and expense, be coupled to an existing automatic film processing machine.

A still further object is to produce a storage magazine for receiving a number of exposed X-ray films and storing them in a manner which prevents adhesion of the films and insures that the feeding machine will deliver the films to the processing machine, one at a time.

A still further object is to produce an improved feeding which can extract the films from the magazine and deliver them to the processing machine.

A still further object is to provide an improved X-ray film feeding machine, the operation of which includes a short "at rest" period in each cycle, and which includes means for signalling said "at rest" period to permit opening of the feeding machine for inspection or for emergency loading or unloading.

A still further object is to produce an X-ray film feeding machine which includes a light excluding door and safty means for arresting the operational cycle whenever the door is open.

A still further object is to provide an X-ray film feeding machine which has a built-in safety device to prevent damage in the event of the failure of one part of the machine or another.

A still further object is to produce an X-ray film feeding machine which can feed large or small films automatically and without any adjustment or adaptation.

The full nature of the invention will be understood from the following specification and the accompanying drawings in which:

FIG. 1 is a diagrammatic elevational view showing an X-ray film feeding machine of my invention coupled to an automatic X-ray film developing, fixing, washing and drying machine.

FIG. 2 is a plan view looking in the direction of line 2—2 on FIG. 1.

FIG. 3 is a sectional view looking in the direction of line 3—3 on FIG. 2.

FIG. 4 is a sectional view looking in the direction of line 4—4 on FIG. 2 and showing the machine loaded.

FIG. 5 is a diagram of the circuit which controls the operation of various components.

FIG. 6 is a view of the lower left-hand corner of FIG. 4 showing the inactive position of the film propelling rolls shown in FIG. 4.

FIG. 7 is similar to FIG. 4 but showing the feeding machine in the act of propelling a film to the nip rolls of the X-ray film processing machine which are shown in FIG. 1.

FIG. 8 is similar to FIG. 7 showing the feeding machine during the return stroke.

FIG. 9 is a sectional view looking in the direction of line 9—9 on FIG. 2 and showing the parts as they appear when the feeding machine is propelling the last film.

FIG. 10 is similar to FIG. 9 but showing the position of the parts when the feeding machine is empty.

FIG. 11 is a perspective view showing the X-ray film storing magazine.

FIG. 12 is a perspective view showing the film propelling mechanism shown detached.

In FIG. 1 there is shown an automatic X-ray processing machine 10 which may be of the type disclosed in my copending application Ser. No. 419,499, filed Dec. 18, 1964, entitled, Machine for Processing X-Ray Film or the Like. Such a machine will include a film developer tank; a film fixing tank; a film washing tank and a film dryer which dries and deposits the dried films in an accessible storage and delivery compartment. Such a processor also includes a conveyor mechanism which carries the film through the various tanks and delivers it to the dryer. Since the processor forms no part of the present invention, it is not shown nor described. It is sufficient to point out that the processing machine includes a pair of film receiving and advancing nip rolls 9 and 11 which are rotated continuously as long as the machine is in operation. It should be noted that film receiving rolls 9 and 11 are driven synchronously with the operation of the film processor so as to be adapted to receive a film F, be it fed manually, or automatically, and to propel the film into the developing tank. In other words, the present feeding machine is only concerned with receiving a number of stacked exposed films and delivering them, one at a time, to the film receiving rolls 9 and 11 of the X-ray film processor 10.

The structure of the automatic film receiving and feeding machine of my invention is best shown in FIGS. 3, 4, 7 and 8 from which it will be seen that all of the parts are enclosed in a fixed outer casing 16, which is provided with hinged, light-excluding doors, or door 18, FIG. 1, which are opened for loading, unloading, or inspection, but which are closed when the feeding machine is in operation. As will hereinafter appear, the doors are so arranged that the feeding machine can only operate when the doors are closed.

Casing 16 carries fixed side brackets 22 which carry ball bearings 24 on which movable carriage 26 is adapted to reciprocate as indicated by the double headed arrow 28 in FIGS. 2 and 4 in the manner and for the purpose hereinafter set forth.

Casing 16 also carries uprights 30, FIG. 3, which support a stationary tray 32 which is adapted to receive a number of stacked exposed films.

Carriage 26 carries vertical brackets 36 which carry a fixed shaft 38 on which are freely rotatable U-shaped brackets 40 which carry arms 42 which carry one way rolls R. By this arrangement, arms 42 and rolls R may be moved to the solid, or to the broken, line position of FIG. 6.

Friction rolls R are adapted to lock when arms 42 are moved upwardly, or in the direction of arrow 44 in FIG. 7 and are adapted to rotate freely, in counter-clockwise direction, when arms 42 are moved downwardly, or in the direction of arrow 46 in FIG. 8. Since one way rolls are available on the market and since their specific structure forms no part of the present invention, they are not shown, nor described. But, for convenience, reference may be had to Patent 3,032,914; Patent 2,070,698; and to Patent 2,038,987; all of which show one-way rotation. It is sufficient for the purpose of this invention that arms 42 carry rolls R and that the rolls can rotate in counter-clockwise direction only.

Carriage 26 is reciprocated relative to fixed tray 32 by means of a pendent lug 47 which is engageable with a pin 48 which is carried by a sprocket chain 50 which travels over sprockets 52 and 54. Sprocket chain 50 is actuated by a reversing motor M which is controlled by a two-position switch 56 which is provided with the switch arm 58. The arrangement of the motor M and switch 56 is such that, in the absence of a film between nip rolls 12 and 14, switch arm 68 moves to the solid line position of FIGS. 4 and 5 in which the motor is energized in a direction to propel carriage 26 upwardly, or in the direction of arrow 44 in FIG. 7. Conversely, when a film enters the nip of rolls 12 and 14, it moves switch arm 58 to the broken line position of FIG. 5 which corresponds to the position of arm 58 in FIG. 7. In this position, the motor is energized to move the carriage downwardly, or in the direction of arrow 46 in FIG. 8. It will be noted that when the carriage 26 is moved in the direction of arrow 44, rolls R, which are locked against rotation, and which are made of soft rubber, or other soft material having a high coefficient of friction, will engage the uppermost film on tray 32 and will push the film towards rolls 12 and 14. But, when carriage 26 moves back, or in the direction of arrow 46, rolls R rotate freely and will exert no disturbing pressure on the film therebeneath. Rolls R are mounted for free, lost motion relative to arms 42 which also have lost motion relative to brackets 40 and shaft 38 whereby rolls R will bear on the film with their own weight and whereby they will be self-adjusting relative to the film therebelow. When pin 48 is moved forward, or in the direction of arrow 44, it engages lug 47 and moves carriage 26 and rolls R toward nip rolls 12 and 14. When pin 48 moves back, or in the direction of arrow 46, it acts as a pacer for the carriage, that is, it limits the speed of the carriage on its return stroke to the speed of the pin. By this arrangement the reciprocal movement of the carriage is controlled and the carriage will stop when the pin stops, thereby insuring quiet operation as distinguished from an operation in which the carriage is allowed to accelerate until it comes to rest with a bang against a fixed stop. The detachable engagement of pin 48 with lug 47 provides a safety feature in that if, for any reason, the motor should not reverse, pin 48, following the curvature of sprocket 52 will be automatically disengaged from lug 47 and will prevent serious damage to the parts.

The feeding machine also includes a normally closed switch 62 which is included in the circuit of the motor reversing pole of switch 56 and which serves to de-energize the motor when the carriage reaches the end of its return stroke. To this end switch 62 is provided with a switch arm 64 which normally assumes the position shown in broken lines in FIG. 4 and in solid lines in FIGS. 5, 7, and 8, to close the reverse circuit of the motor, but which is adapted to be moved, by carriage 26, to the position shown in solid lines in FIG. 4 and in broken lines in FIG. 5, to open the reverse circuit of the motor. Movement of switch arm 64 to the solid line position of FIG. 4 also energizes a signal 66 to apprise the operator that the carriage is momentarily at rest. If desired, an auxiliary, normally closed switch 68 can be mounted so as to be opened when the light-excluding door is opened so as to deenergize the motor as long as the doors are opened.

In an early prototype, the films were stacked on tray 32, one on top of another, and it was found that an upper film being pushed toward nip rolls 12 and 14, by rolls R, tended to drag the film therebeneath, with the result that two, or more, films were pushed into the nip of rolls 12 and 14 simultaneously. To overcome this difficulty, I devised the magazine which is best shown in FIG. 11 and which consists of a number of spacer sheets 70, 71, etc., which rest on a base plate 74 and the edges of which are bound in channel 76. Sheets 70, 71, etc., are provided with spaced openings 78 and 80 and may be turned, like the leaves of a book, or as shown in FIG. 11, so as to receive X-ray films F, F–1, etc., therebetween. The exit edge of base 74 is bent down as at 75 to facilitate the passage of the films thereover.

While in the drawings, I have shown only two films F and F–1, and a magazine having only two spacer sheets 70 and 71, it is to be understood that the magazine can have as many as a dozen or more spacer sheets, for receiving a corresponding number of films. It will be noted that rolls R will have access to the successive films F, through openings 78 and 80 in the respective spacer sheets. Since successive films are separated from each other by the spacer sheets, the propulsion of an upper film F by rolls R will not in any way affect a film F–1 below spacer sheet 71 and so on down until the last film, below the last spacer sheet, has been propelled.

In order to stop motor M in the absence of any film in the feeding machine, I provide fixed tray 32 with a slot 82 through which projects the switch arm 84 of a normally closed switch 86, which is housed in a well 88 which depends from carriage 26. Switch arm 84 is located in a depression 90 so as to be below the upper surface of tray 32. By this arrangement, as long as there is any film on fixed tray 32, or in the magazine, the roll R which registers with slot 82 will be unable to reach switch arm 84. But, as soon as the last film has been ejected, one of the rolls R, due to the lost motion previously described, will drop into recess 90, and will depress switch arm 84 to de-energize motor M. To re-load an empty magazine or to replace it with a loaded one, arms 42 are moved to the out-of-the-way position as shown in phantom in FIG. 6.

The wiring diagram shown in FIG. 5 is self-explanatory but, for convenience, it is briefly described as follows:

Lead L1 is connected to normally closed switch 68 which is moved to its open, broken line position, only when the door 18 is opened. Switch 68 is connected to two-position switch 56. This switch normally assumes the solid position shown in solid lines and is only moved to its broken line position by the presence of a film in the nip of rolls 12 and 14. Switch 56 is connected to switch 86 which normally assumes the closed, solid line position and is only moved to the open, broken line position when rolls R pass wholly through the magazine which happens olny when there is no exposed film left for the rolls to push. In its solid line position, arm 84 of switch 86 is connected to the "up" side of the motor, that is, to the side which rotates in a direction to move the carriage in the direction of arrow 44 in FIG. 4.

The reverse or "down" side of the motor M is connected to the arm 58 of switch 56 when said arm is in its broken line position and it is also connected to two-position switch 62, the arm 64 of which normally assumes a first closed, solid line position in which it completes the circuit of the reverse side of the motor. The arm 64 of switch 62 is movable, by the carriage, to the broken line position to energize lamp 66 which indicates that the machine is in an "in-between" position in which the door 18 can be safely opened.

It follows that when the arms of switches 68, 56, and 86, are in their solid line positions, the motor will run in the direction of arrow 44 to push films toward rolls 12 and 14, and the circuit of the reverse side of the motor will be broken.

When, due to the presence of film between roll 12 and 14, switch 56 moves to its broken line position, it completes the circuit through the reverse side of the motor which now permits the carriage to move down, or away from rolls 12 and 14, until limit switch 62 is opened. By this time, the film previously delivered to rolls 12 and 14 will have cleared these rolls and switch arm 58 again assumes the solid line position to begin a new cycle.

It is understood that the total absence of film in the magazine (switch 86) will de-energize the "up" side of the motor without energizing the "down" or reverse side thereof, and that opening door 18 will de-energize both sides of the motor.

The operation is as follows:

The feeding machine is mounted, in any suitable manner in relation to nip rolls 12 and 14 so that, just before rolls R reach the end of their film propelling stroke, as in the direction of arrow 44 in FIG. 7, the leading end of the film being propelled will have been firmly engaged between nip rolls 12 and 14. With doors 18 and, hence, switch 68 closed, motor M is energized to move carriage 26 and, hence, arms 42 to the right in FIG. 4. Since friction rolls R rest on the uppermost film which is exposed through openings 78 and 80, this movement of carriage 26 causes rolls R to push the uppermost film toward rolls 12 and 14.

As a film enters between rolls 12 and 14 it pushes arm 58 of switch 56 upwardly, or from the position of FIG. 5 to the position of FIG. 7. This immediately causes motor M to reverse and move carriage 26 back or in the direction of arrow 46 in FIG. 8. It should be noted that the speed of motor M is such that the carriage completes one cycle, that is, it moves forward and back before the film which has entered rolls 12 and 14 has passed completely through the rolls. This time differential is subject to adjustment but in a successfully tested prototype, the carriage stayed at rest at the end of its back stroke, or in the position of FIG. 4 approximately three seconds while the film delivered to the rolls 12 and 14 by the previous forward stroke of the carriage, completed its passage between said rolls. It will be remembered that, in the position of FIG. 4, carriage 26 opens switch 62 to de-energize the reversing side of the motor and to energize lamp 66. This apprises the operator that the feeding machine is at rest and if, during this time, doors 18 are opened, switch 68 is opened and it makes it impossible for any of the other switches to energize the motor. With the doors open, the operator can remove an empty magazine and can insert a loaded one or, if it is desired to feed a film out of its turn, the preferential film is merely placed below the uppermost spacer sheet and the doors are closed. Since, at this stage, there is no film between nip rolls 12 and 14 and since switch arm 58 is in its lower position, closing of switch 68 by closing the doors, energizes the motor in a direction to propel the next film which is accessible to rolls R through holes 78 and 80 in the next lower spacer sheet to begin a new cycle. In the absence of deliberate interruption by the operator, the feeding machine will continue to cycle until the last film has been delivered to the nip rolls. As soon as the trailing edge of the last film has cleared depression 90 in fixed tray 32, one of rolls R will drop into said depression to open switch 86 which, like door operated switch 68, prevents energization of the motor until roll R is lifted off switch arm 84. When it is desired to insert a film into a magazine already in the machine, or when it is desired to replace an empty magazine with a loaded one, arms 42 are moved from the solid, to the broken line position of FIG. 6.

In radiological studies, large, or full size films are used for photographing a large body area, and small films are used for photographing small areas. The film feeding machine above described is designed to handle the large size films which are contacted by all four rolls R passing through all openings 78 and 80, and it is also designed to handle one, or two, small films which are contacted by rolls passing through the particular openings 78 or 80, as the case may be. For example, one small film can be placed below opening 78 and another can be placed under holes 80. An intermediate size film can be placed so as to be accessible through the inner juxtaposed holes 78 and 80, and so on. It will be noted that the length of openings 78 and 80 is slightly greater than the length of the stroke of the rolls.

As stated, experience showed that without the spacer sheets, the stacked films tend to stick together. But, actual experience has shown that by interleaving the films with the spacer sheets, the tendency to stick is completely eliminated and when propelling rolls R are moved towards nip rolls 12 and 14, only the film on which rolls R happen to be resting will be moved, with no effect whatever on the film below the next spacer sheet.

From the foregoing it will be seen that the interleaving of films with spacers provides enough surface film for adequate engagement by rolls R but that it prevents adhesion; that the magazine of FIG. 11 permits loading at, or away from the feeding machine; that it also permits emergency film loading, even though the magazine already in the machine is not empty, that by loading the magazine away from the machine, the interruption of the machine is limited to the two or three seconds needed to open the doors and to exchange the loaded and empty magazines, and that the propulsion of successive films is triggered by the passage of successive films between the nip rolls of the processing machine whereby no film will be propelled as long as any part of the previously propelled film remains between nip rolls 12 and 14.

It will also be seen that I have devised a novel method of feeding film which, broadly stated, includes the step of interleaving the films with the spacers, pushing the films through holes in the spacers, and triggering the movement of each film by the progress of the previous film.

What I claim is:

1. A machine for successively feeding a thin, flexible film from a stock of films, said machine including, in combination,
    a magazine consisting of a plurality of leaves secured together along one edge thereof for receiving individual films therebetween,
    a fixed tray for supporting said magazine,
    a carriage mounted for reciprocal movement relative to said tray,
    there being registering openings formed in said leaves,
    a motor for reciprocating said carriage,
    at least one roller pivotally carried by said carriage and movable with said carriage from a point near the bound edges of said leaves toward the opposite edges thereof to expel the film therebelow from said magazine,
    said roller passing through the openings in said leaves to contact a film therebelow, and
    a normally closed switch below said magazine for energizing said motor,
    said switch having an arm engageable by said roller in the absence of any film in said magazine to open said switch and de-energize said motor.

2. The machine defined in claim 1 wherein said roller locks during movement in film expelling direction and rotates freely during its reverse movement.

3. The machine defined in claim 1 which also includes:
    an outer casing enclosing said films,
    a light excluding door for said casing, and
    a two position control switch located in the path of movement of said door and operative to energize said motor when the said door is closed and to de-energize said motor when said door is opened.

4. A machine for feeding a succession of films to a film processing apparatus having a pair of rotary, film receiving and advancing nip rolls and a prime mover for rotating said rolls in film advancing direction, said machine including:
    a fixed tray for supporting a magazine consisting of spacer leaves bound together along one edge thereof for receiving a plurality of films interleaved therebetween,
    means mounting said tray adjacent said nip rolls,
    a carriage mounted for movement in a first direction toward said nip rolls and in a second, opposite direction away from said nip rolls,
    a plurality of spaced, one way rolls,
    there being spaced openings in said spacer leaves providing access for said one way rolls to the film between said leaves, said one way rolls being pivotally mounted on said carriage for movement to a first position in which they rest on the uppermost of said films and to a second position in which said one way rolls are out of reach of said films, said one way rolls being locked against rotation during movement of the carriage in said first direction so as frictionally to engage and push said uppermost film toward said nip rolls, said one way rolls being freely rotatable during movement of the carriage in said second direction so as to exert no pull on the next film on which they rest, a reversing motor for moving said carriage in either of said first and said second directions, a two position switch for controlling the direction of rotation of the motor, and a switch arm for moving said two position switch to either of its positions, said switch arm being located in the path of movement of a film toward said nip rolls and movable, in the absence of a film between said nip rolls, to a first position in which said two position switch energizes said motor to move said carriage in said first direction to cause said one way rolls to propel a film from said magazine toward said nip rolls, said switch arm being moved, by a film between said nip roll to a second position in which said two position switch energizes said motor to move said carriage in said second direction to disengage said one way rolls from said film and to move said one way rolls back into engagement with the next film to be propelled.

5. The machine defined in claim 4 and a limit switch included in the circuit of the reversing side of the motor and disposed in the path of movement of said carriage in said second direction and adapted to be opened when said carriage is at the end of its movement in said second direction to de-energize the circuit of the reversing side of the motor.

References Cited by the Examiner

UNITED STATES PATENTS

| | | | |
|---|---|---|---|
| 717,021 | 12/1902 | Pollak | 95—89 |
| 984,785 | 2/1911 | Towne | 221—88 |
| 1,016,779 | 2/1912 | Ruppel | 221—259 |
| 1,799,106 | 3/1931 | Laxo | 221—14 |
| 2,003,399 | 6/1935 | Tamsitt. | |
| 2,008,513 | 7/1935 | Muros | 206—46 |
| 2,463,450 | 3/1949 | Wisner | 206—46 |
| 2,832,506 | 4/1958 | Hatcher | 221—14 |
| 2,883,174 | 4/1959 | Cobb. | |
| 2,904,214 | 9/1959 | Miller | 221—259 |
| 3,092,209 | 6/1963 | Burgy. | |
| 3,126,122 | 3/1964 | Sacre | 221—259 |

ROBERT B. REEVES, *Primary Examiner.*

WALTER SOBIN, *Examiner.*